(12) United States Patent
Engler et al.

(10) Patent No.: US 7,452,393 B2
(45) Date of Patent: Nov. 18, 2008

(54) INSTALLATION FOR HYDROGEN PRODUCTION AND METHODS FOR USING SAME

(75) Inventors: Yves Engler, Chatou (FR); Edie Michalik, Santeny (FR); Jan Cobbaut, Denderleeuw (BE); Olivier Gonfalone, La Haye (NL); Dirck Simons, Zandhoven (BE)

(73) Assignee: L'Air Liquide, Societe Anonyme A Directorie et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 587 days.

(21) Appl. No.: 10/496,720

(22) PCT Filed: Nov. 20, 2002

(86) PCT No.: PCT/FR02/03971

§ 371 (c)(1),
(2), (4) Date: Oct. 12, 2004

(87) PCT Pub. No.: WO03/043718

PCT Pub. Date: May 30, 2003

(65) Prior Publication Data

US 2005/0034372 A1    Feb. 17, 2005

(30) Foreign Application Priority Data

Nov. 22, 2001    (FR)    ................... 01 15117

(51) Int. Cl.
*C01B 3/24*      (2006.01)
*C01B 3/36*      (2006.01)
*G05D 7/00*      (2006.01)
*H01M 8/04*      (2006.01)

(52) U.S. Cl. ............. 48/198.3; 48/197 R; 422/110; 422/114; 422/115; 429/22; 429/23; 429/24; 429/25

(58) Field of Classification Search ............ 48/198.3, 48/197 R; 422/110, 114, 115; 429/22–25
See application file for complete search history.

(56) References Cited

U.S. PATENT DOCUMENTS

| | | | |
|---|---|---|---|
| 4,553,981 A | 11/1985 | Fuderer | |
| 4,822,384 A | 4/1989 | Kato et al. | |
| 5,980,857 A | 11/1999 | Kapoor et al. | |
| 6,007,606 A | * 12/1999 | Baksh et al. | ........... 95/98 |
| 6,322,611 B1 | 11/2001 | Engler | |
| 2002/0014153 A1 | 2/2002 | Baksh et al. | |

FOREIGN PATENT DOCUMENTS

| | | |
|---|---|---|
| EP | 0 266 051 | 5/1988 |
| EP | 1 097 902 | 5/2001 |
| FR | 2 788 051 | 7/2000 |

OTHER PUBLICATIONS

International Search Report for PCT/FR02/03971.

* cited by examiner

*Primary Examiner*—Walter D. Griffin
*Assistant Examiner*—Lessanework T Seifu
(74) *Attorney, Agent, or Firm*—Elwood Haynes

(57) ABSTRACT

An installation and process for producing hydrogen, which includes a purification unit for purifying a hydrogen-rich synthesis gas and for producing hydrogen and a waste gas, along with the additional equipment required in order to continue operation in the event of a purification unit shutdown.

9 Claims, 2 Drawing Sheets

INSTALLATION FOR HYDROGEN PRODUCTION AND METHODS FOR USING SAME

BACKGROUND

The invention relates to an installation for producing at least hydrogen, this installation comprising at least:
- a purification unit for purifying a hydrogen-rich synthesis gas and for producing hydrogen and a waste gas,
- a first line (5; 105) for conveying the synthesis gas to the purification unit,
- a second line (9; 109) for conveying the waste gas from the purification unit to burners, and
- a buffer tank (14) placed in the second line.

The invention also relates to a method to be employed when operating this installation, following an unscheduled shutdown of the purification unit.

Furthermore, the invention relates to a method for starting up certain sorts of installations of the aforementioned type and to a method for decreasing the hydrogen yield produced by same.

In an installation of the aforementioned type, the purification unit produces a waste gas which is recovered in order to be burned in the burners, to which the supply is interrupted during an unscheduled shutdown of this purification unit, which is disadvantageous.

In particular, this installation may be equipped with a methane reforming unit, this reforming unit being heated and provided for the purpose with burners in which the waste gas is burned. In such a configuration, an accidental shutdown of the purification unit often results in the shutdown of the reforming unit. This is a drawback, and is especially serious because the time required to restart this reforming unit amounts to tens of hours, all very costly. Furthermore, even in cases where the reforming unit is successfully kept in operation, it can only return to steady state conditions after several hours.

In consequence, numerous efforts have been made to improve the reliability of the purification units employed. However, these purification units still tend to stop accidentally.

The object of the invention, which aims in particular to correct the aforementioned drawback, is therefore to improve the operation and/or profitability of an installation of the aforementioned type.

SUMMARY

To achieve this, the subject of the invention is an installation of this type, characterized in that it comprises a third line which is equipped with a first flow control valve and connects the first line to the second line.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
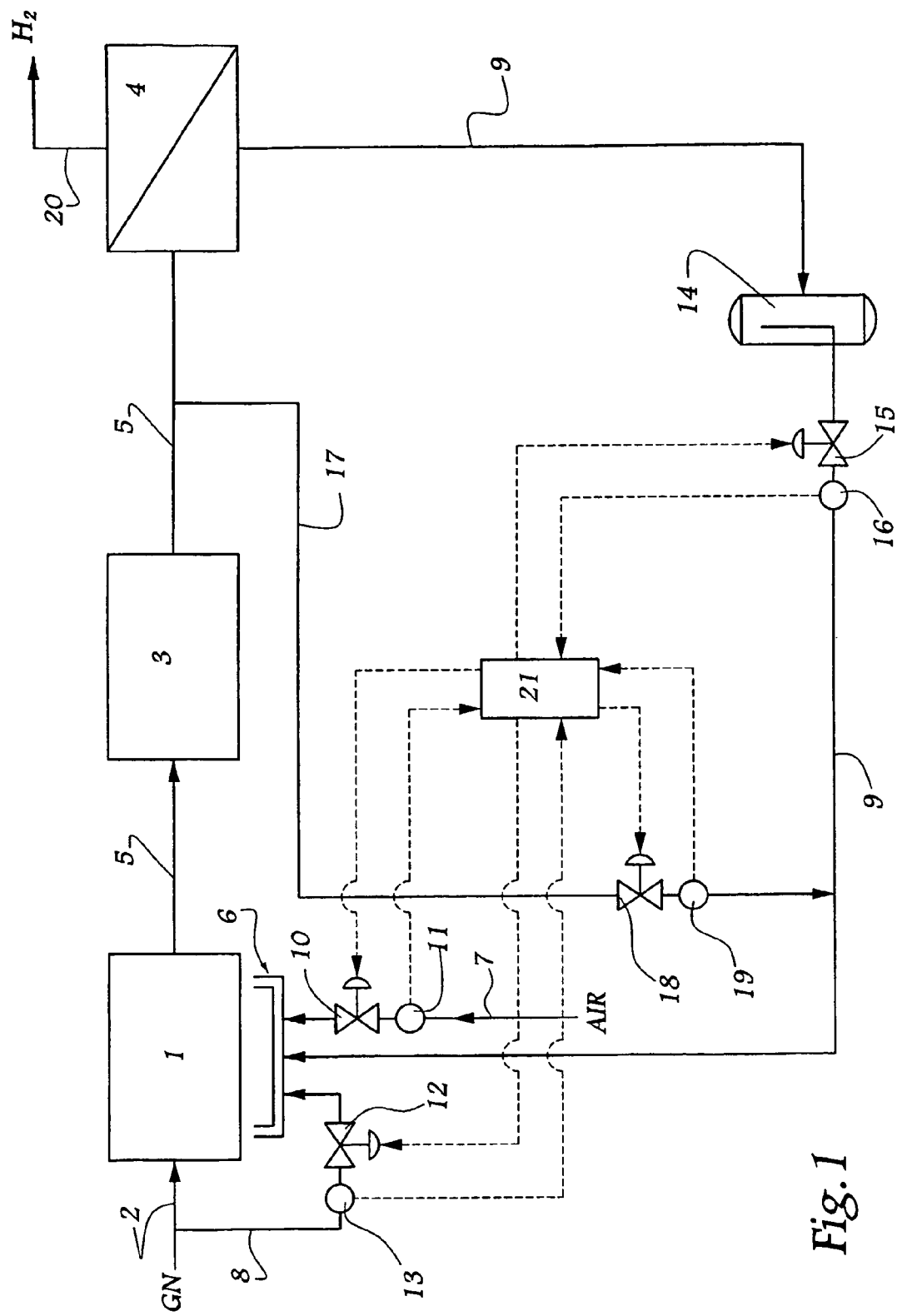
FIG. 1 is a schematic and simplified view of an installation according to the invention and designed to produce hydrogen from a gas containing methane.

To achieve this, the subject of the invention is an installation of this type, characterized in that it comprises a third line which is equipped with a first flow control valve and connects the first line to the second line.

According to other advantageous features of this installation:
- a second flow control valve is provided downstream of the buffer tank, the third line being connected to the second line downstream of this second valve;
- it comprises at least a first and a second flowmeter that are placed to measure the flow rates in the first and the second valves respectively, and also a unit for controlling these flow rates and for calculating and controlling the degree of opening of each of the first and second valves;
- the purification unit is of the selective adsorption type with cyclic pressure variation;
- it comprises a unit (1; 101) for reforming methane with steam, which is provided with said burners for its heating and which is intended for producing the hydrogen-rich synthesis gas, the purification unit being located downstream of the reforming unit and intended for producing hydrogen extracted from the synthesis gas;
- it comprises a reactor for converting carbon monoxide to carbon dioxide, placed between the reforming unit and the purification unit, the third line being connected to the first line downstream of this conversion reactor;
- it comprises a separation unit located between the reforming unit and the purification unit and intended to extract the carbon monoxide present in the synthesis gas, and also a fourth line which is equipped with another flow control valve and connects the first line to the second line, the third and fourth lines being connected to the first line downstream and upstream of the separation unit respectively:
- the separation unit is a cryogenic separation cold box;
- a carbon dioxide purification device and a desiccation device are placed between the reforming unit and the separation unit, the fourth line being connected to the first line upstream of the carbon dioxide purification device and of the desiccation device.

The subject of invention is also a method for operating an installation as described hereinabove, in which:
- in the purification unit, the hydrogen present in the synthesis gas is extracted and a waste gas is recovered,
- this waste gas is stored in the buffer tank, and
- said burners are supplied at least with the waste gas stored in the buffer tank, this method being characterized in that, following an unscheduled shutdown of the purification unit:
- the burners continue, at least initially, to be supplied with waste gas, employing the gas stored in the buffer tank,
- the first flow control valve is opened progressively, in order to supply the burners with an increasing quantity of replacement gas consisting of at least a portion of the synthesis gas.

According to other advantageous features of this method, it comprises the steps in which:
- the second flow control valve is progressively closed,
- the flow rate of the waste gas supplied to the burners is measured continuously, the theoretical flow rate of replacement gas to be burned in order to compensate for the decrease in flow rate of the waste gas supplied to the burners is continuously calculated in real time, and the actual flow rate of the replacement gas supplied to the burners is regulated about said calculated theoretical flow rate, by adjusting the degree of opening of the first flow control valve.

Furthermore, the subject of the invention is a method for starting up an installation as defined above, characterized in that it comprises:

a first step in which the methane reforming unit is progressively started up by supplying the burners with at least a portion of the synthesis gas produced by this reforming unit, this portion of the synthesis gas being taken by means of the third line, and a second step in which the purification unit, which produces a waste gas, is started up, and the burners are supplied with an increasing share of waste gas progressively replacing the portion of synthesis gas supplied to the burners.

Furthermore, the subject of invention is a method for reducing the hydrogen yield produced by an installation as defined above, in which:

in the reforming unit, the gas containing methane is reacted with steam, to produce a hydrogen-rich synthesis gas, in the purification unit, the hydrogen present in the possibly pretreated synthesis gas is extracted, and a waste gas is recovered, the burners are supplied with this waste gas, and the heating of the reforming unit is supplemented by burning an auxiliary fuel, characterized in that, at least initially:

the flow rate of synthesis gas for treatment in the purification unit is reduced, by removing a portion thereof by means of the third line, this portion is used to supply the burners, and the flow rate of the supplementarily burned auxiliary fuel is simultaneously reduced.

In these figures, the solid lines which symbolize flow lines are directed to indicate the directions of flow of the fluids in each of the two installations shown. Similarly, the dotted lines which symbolize lines for conveying monitoring and control data are directed to indicate in which direction this data flows.

Figure 2:
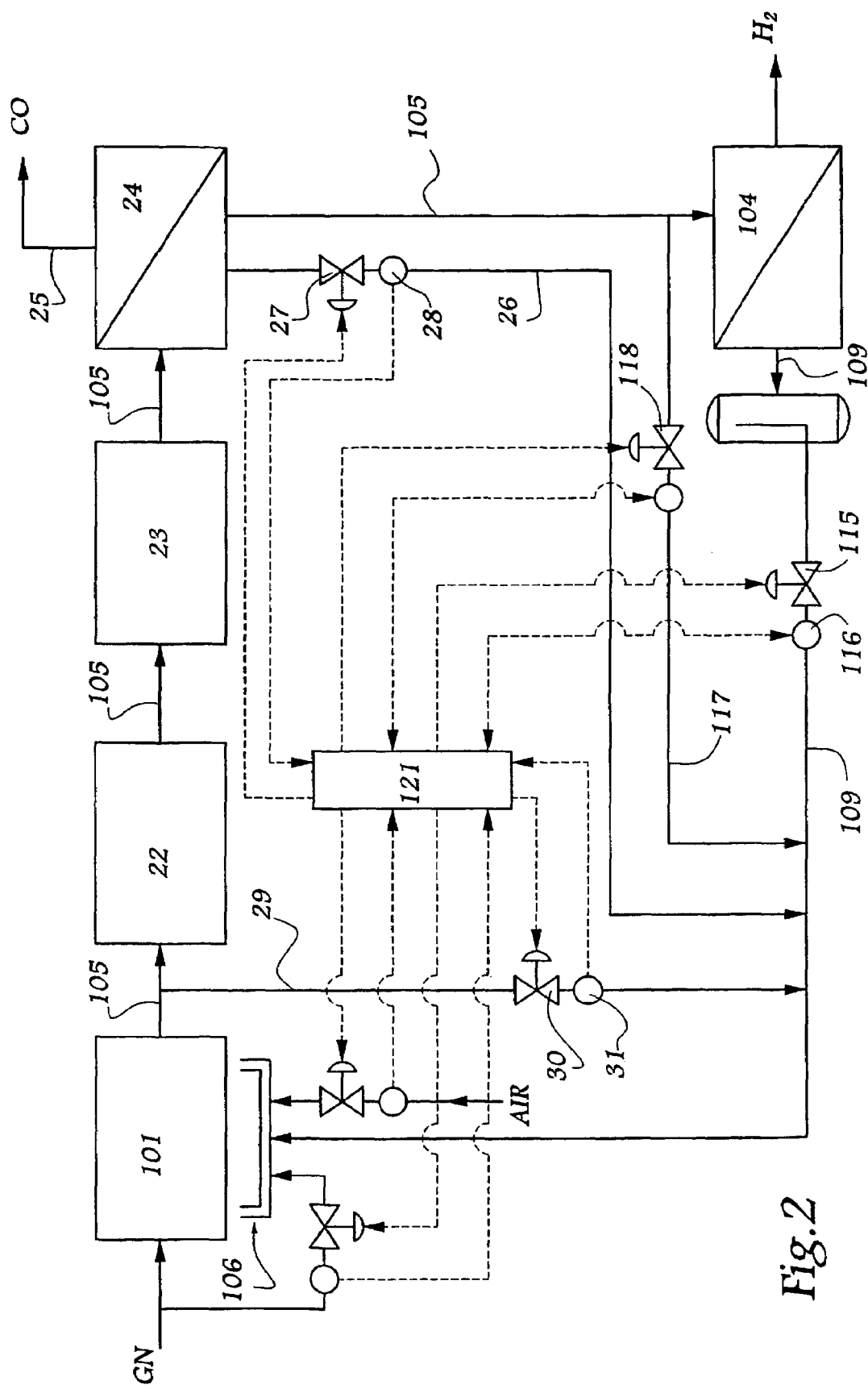
FIG. 2 is a schematic and simplified view of an installation according to the invention and designed to produce hydrogen and carbon monoxide from a gas containing methane.

Furthermore, the installations shown are organized in a conventional and well-known basic arrangement. In FIGS. 1 and 2, this basic arrangement, which is actually complex, is therefore simplified by omitting certain components largely known per se, solely for the sake of clarity.

An installation according to the invention is shown in FIG. 1. It is an installation for producing hydrogen from a gas containing methane, such as natural gas. It comprises a unit 1 for reforming methane with steam, designed to be supplied with pressurized natural gas NG via a line 2, and for producing a hydrogen-rich synthesis gas as output, a reactor 3 for converting carbon monoxide to carbon dioxide, placed downstream of the reforming unit 1, and a purification unit placed downstream of the conversion reactor 3 and designed to extract the hydrogen present in the synthesis gas and to produce a waste gas. A line 5 for conveying the synthesis gas at high pressure connects the outlet of the reforming unit 1 to the inlet of the conversion reactor 3 and the outlet of the latter to the purification unit 4.

For its heating, the reforming unit 1 comprises burners 6 equipped with an atmospheric air intake 7. These burners 7 are designed to be supplied with natural gas conveyed by means of a line 8 branched off the line 2, and also with waste gas, at low pressure, produced by the purification unit 4. This waste gas is conveyed by a line 9 from the purification unit 4 to the burners 6.

The air flow rate in the air intake 7 is intended to be regulated by a valve 10 and measured by a flowmeter 11. The air intake may be equipped with a blower, in which case the air flow rate measured by the flowmeter 11 may be regulated by controlling this blower.

The line 8 itself is provided with a valve 12 and with a flowmeter 13, respectively intended to regulate and to measure the flow rate of the natural gas supplied to the burners 6.

Since the purification unit 4 is of the type based on selective adsorption by cyclic pressure variation, a buffer tank 14, designed to dampen the variations in flow rate of the waste gas leaving this purification unit 4, is placed in the line 9 through which this waste gas upstream of the burners 6 flows. A valve 15 for regulating the rate of the flow leaving the buffer tank 14 and a flowmeter 16 for measuring this flow rate are also provided in the line 9.

A line 17 connects the lines 5 and 9 which convey the synthesis gas and the waste gas respectively. More specifically, this line 17 is connected to the line 5, between the conversion reactor 3 and the purification unit 4, and to the line 9, downstream of the valve 15 and of the flowmeter 16. It is equipped with a valve 18 for regulating the flow rate of the synthesis gas that it conveys, and also a flowmeter 19 for measuring this flow rate.

The purification unit 4 comprises an outlet for the hydrogen produced, to which a line 20 for removing same is connected.

A unit 21 for monitoring, calculating and controlling the flow rates of air, natural gas, waste gas and synthesis gas that are supplied to the burners 6 is designed, on the one hand, to receive a flow rate measurement from each of the flowmeters 11, 13, 16 and 19 and, on the other hand, to calculate and control the degree of opening of each of the valves 10, 12, 15 and 18.

In steady-state operation, the valve 18 is closed, so that the burners 6 only burn waste gas and auxiliary natural gas. The installation shown in FIG. 1 accordingly operates in a manner that is known per se.

In case of sudden and unscheduled shutdown of the purification unit 4, said unit is automatically isolated from the rest of the installation, and the buffer tank 14 is no longer supplied with waste gas. The monitoring, calculation and control unit 21 immediately actuates the progressive closure, at a preset rate, of the valve 15. Simultaneously, it calculates, in real time and continuously, the theoretical flow rate of synthesis gas that must be burned in order to compensate for the decrease in flow rate of the waste gas supplied to the burners 6, and it opens and controls the valve 18 in order to regulate, about the theoretical flow rate that it has calculated, the actual flow rate of the synthesis gas supplied to the burners 6. The calculation in question takes account of the calorific values of the waste gas and the synthesis gas.

As a variant, the degree of opening of the valve 18 is not calculated as a function of the measurement taken by the flowmeter 16, but it is the direct consequence of the regulation of a temperature connected with the operation of the burners 6, like the temperature of the combustion gases or the temperature of the reforming reaction.

The substitution of the waste gas by a portion of the synthesis gas cannot take place instantaneously because of the response time of the equipment, particularly the valves, that are then involved. Thus, the buffer tank 14 makes the transient progressive substitution phase described above possible.

After this phase is completed, the reforming unit 1 has preserved a stable operating regime, although its burners 6 are now only supplied with natural gas and synthesis gas, since valve 15 is closed.

The purification unit 4 can then be promptly restarted. This saves time, amounting to tens of hours, normally required to restart the reforming unit 1.

We shall now attempt to describe an advantageous procedure for starting up the installation shown in FIG. 1. This procedure comprises a first and a second step. In the first step, the reforming unit 1 is started up progressively by supplying the burners 6 with at least a portion of the synthesis gas produced. The flow rate of this portion, which flows in the line 17, is determined by the degree of opening of the valve 18, which is controlled by the unit 21.

In the second start-up step, the purification unit 4 is started up by supplying it with an increasing flow rate of synthesis gas. This purification unit 4 then produces hydrogen and waste gas which is progressively substituted with the synthesis gas supplied to the burners 6.

The combustion of synthesis gas in the burners 6 serves to economize the fuel that would otherwise have to be consumed during start-up of the installation.

A procedure will now be described that can advantageously be employed when it is desirable to rapidly reduce the quantity of hydrogen produced.

The reforming unit 1 and the purification unit 4 both exhibit some inertia, so that the quantity of hydrogen produced cannot be reduced instantaneously. The reforming unit 1 evolves more slowly than the purification unit. Therefore, in the prior art, it is this that determines the rate at which the quantity of hydrogen produced is reduced. If this rate is lower than the desired rate, the surplus hydrogen is burned in a flare.

If, in the installation shown in FIG. 1, it is decided to slow the purification unit 4 faster than can be done with the reforming unit 1, the portion of synthesis gas that is no longer supplied to the purification unit 4 can be removed via the line 7, and burned in the burners 6. This accordingly reduces the flow rate of natural gas supplied to these burners 6, thereby achieving a saving.

As a variant, the location of each of the two connections of the line 17 to the lines 5 and 9 respectively can be shifted. If the connection of this line 17 to the line 9 is placed upstream of the buffer tank 14, it is possible, during the transition procedures described hereinabove, to control the valve 18 in order to regulate the pressure of the buffer tank 14, the valve 15 then being controlled to a setpoint value by the flow rate regulation in the line 9. This is done by applying a correction to the measurement taken by the flowmeter 16, in order to take account of the change in composition of the gas flowing through this line 9.

FIG. 2 shows an installation for producing hydrogen and carbon monoxide from natural gas. This installation is designed in an arrangement roughly similar to the installation shown in FIG. 1. Thus we shall only describe hereinbelow what distinguishes it from this installation shown in FIG. 1, of which the components are identified by reference numerals which are increased by 100 in order to denote, in what follows, the similar components of the installation illustrated in FIG. 2.

The reactor 3 for converting carbon monoxide to hydrogen is replaced with a carbon dioxide purification device 22, a desiccation device 23, placed downstream of the purification device 22, and a separation unit formed by a cryogenic separation cold box 24. This cold box 24 is placed downstream of the desiccation device 23. It is designed to extract the carbon monoxide present in the synthesis gas passing through it.

In addition to carbon monoxide, for the removal of which a line 25 is connected to the cold box 24, the latter is designed to produce a waste gas. A line 26 for transporting this waste gas connects the cold box 24 to the line 109, to which it is connected downstream of the valve 115 and of the flowmeter 116. The line 26 is equipped with a control valve 27 and with a flowmeter 28. The valve 27 is designed to be controlled by a monitoring, calculation and control unit 21, as a function of the measurement taken by the flowmeter 28.

The line 17, which connects the lines 109 and 105, is connected to the latter between the cold box 24 and the purification unit 104.

Another line, with reference numeral 29, also connects the line 105 to the line 109, to which it is also connected downstream of the valve 115 and of the flowmeter 116. Its connection to the line 105 nevertheless distinguishes it from the line 117 insofar as it is placed upstream of the cold box 24, more precisely between the reforming unit 101 and the carbon dioxide purification device 22. The line 29 is provided with a flow control valve 30 and with a flowmeter 31, both connected to the monitoring, calculation and control unit 121.

In steady-state operation, the valves 118 and 30 are closed and the installation is in conventional operation, which is known per se.

During a sudden and unscheduled shutdown of the purification unit 104, the valve 115 closes progressively, while the valve 118, controlled by the unit 121, is opened by following a procedure similar to the procedure, described above, which is employed when the purification unit 4 of the installation shown in FIG. 1 is suddenly shut down. On completion of this procedure, the portion of the installation which extends from the reforming unit 101 to the cold box 24 has preserved a substantially steady-state operating regime, which offers two advantages. Firstly, it avoids the slow and costly restart of the reforming unit 101. Secondly, the production of carbon monoxide can be continued despite the shutdown of the purification unit 104.

If the unscheduled shutdown concerns the cold box 24, which results in the consecutive shutdown of the purification unit 104, a procedure similar to the procedure explained above, which is employed during the shutdown of the purification unit 4 of the installation shown in FIG. 1, is followed. The valve 30, controlled by the unit 121, then plays a similar role to that of the valve 18, and it is opened in order to compensate for the progressive closure of the valve 115. Thus, the reforming unit 101 is kept in operation.

Furthermore, the two procedures, described above, which are designed to be followed, one during start-up of the installation shown in FIG. 1, and the other during a reduction in the quantity of hydrogen produced by this installation, can also advantageously be employed in the installation shown in FIG. 2, their transposition by a person skilled in the art considered here posing no particular difficulty.

As a variant, one of the lines 29 and 117 can naturally be eliminated.

Moreover, the variants considered for the installation shown in FIG. 1 may be adapted to the installation shown in FIG. 2.

Furthermore, the units 1 and 101 may be of various types. They may, for example, be configured for the use either of simple steam methane reforming (SMR), or a convective type of steam methane reforming (TCR).

Moreover, other sorts of synthesis gas generators than the units 1 and 101 for steam methane reforming can be used for the purpose of producing the hydrogen-rich synthesis gas. For example, this could be a chemical reactor, designed for the application of a catalytic or non-catalytic reaction.

In addition, the purification units 4 and 104 can be designed implement various sorts of processes. For example, they may be of the type based on selective adsorption by cyclic pressure variation, or may be formed from a cryogenic separation cold box, or could even use the principle of scrubbing with amines.

Similarly, the cold box 24 can be replaced with a separation unit of another type, designed to extract the carbon monoxide present in the synthesis gas by a method other than the cryogenic method. For example, it can be replaced with a selective membrane device.

Moreover, particularly if the synthesis gas is produced by means of a chemical reactor, the burners 6 can be used to equip not the reforming unit 1 or 101, replaced with this chemical reactor as required, but another device such as a furnace or a steam production boiler, it being possible, for example, for this other device to form part of a production line other than the one in which the purification unit 4 or 104 is arranged.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An installation for producing at least hydrogen, comprising:
   i) a purification unit configured to separate hydrogen from a synthesis gas and produce a waste gas separate from the hydrogen;
   ii) a first line for conveying the synthesis gas to the purification unit;
   iii) a second line for conveying the waste gas from the purification unit to burners;
   iv) a buffer tank placed in said second line; and
   v) a third line, wherein said third line equipped with a first flow control valve and connects said first line to said second line,
   further comprising a second flow control valve provided downstream of the buffer tank, wherein said third line is connected to said second line downstream of said second control valve.

2. The installation of claim 1, further comprising at least a first and a second flowmeter that are placed to measure the flow rates in said first and said second control valves respectively, a unit for controlling said flow rates and for calculating and controlling the degree of opening of each of said first and second control valves.

3. An installation for producing at least hydrogen, comprising:
   i) a purification unit configured to separate hydrogen from a synthesis gas and produce a waste gas separate from the hydrogen;
   ii) a first line for conveying the synthesis gas to the purification unit;
   iii) a second line for conveying the waste gas from the purification unit to burners;
   iv) a buffer tank placed in said second line; and
   a third line, wherein said third line equipped with a first flow control valve and connects said first line to said second line,
   further comprising a unit for reforming methane with steam, which is provided with said burners for its heating and which is intended for producing the hydrogen-rich synthesis gas, wherein said purification unit is located downstream of said reforming unit and intended for producing hydrogen extracted from the synthesis gas,
   further comprising a separation unit located between said reforming unit and said purification unit and intended to extract the carbon monoxide present in the synthesis gas, wherein a fourth line which is equipped with another flow control valve and connects said first line to said second line, said third and fourth lines being connected to said first line downstream and upstream of the separation unit respectively.

4. The installation of claim 3, wherein said separation unit is a cryogenic separation cold box.

5. The installation of claim 3, further comprising a carbon dioxide purification device and a desiccation device which are placed between said reforming unit and said separation unit, wherein said fourth line is connected to the first line upstream of said carbon dioxide purification device and of said desiccation device.

6. A method comprising:
   i) extracting hydrogen from a synthesis gas in a purification unit, wherein a first line conveys the synthesis gas to the purification unit;
   ii) recovering a waste gas from the purification unit via a second line;
   iii) storing said waste gas in a buffer tank placed in the second line;
   iv) supplying, via the second line, one or more burners with at least said waste gas, and further comprising, following an unscheduled shutdown of the purification unit:
   i) continuing to supply said burners, at least initially, with said gas from said buffer tank; and
   ii) opening progressively a first flow control valve of a third line connecting the first line to the second line in order to supply said burners with an increasing quantity of replacement gas consisting of at least a portion of said synthesis gas.

7. The method of claim 6, wherein said installation further comprises a second flow control valve provided downstream of said buffer tank, wherein said third line is connected to said second line downstream of said second control valve, the method further comprising:
   i) closing progressively said second flow control valve;
   ii) measuring continuously the flow rate of said waste gas being supplied to said burners;
   iii) calculating continuously, in real time, the theoretical flow rate of replacement gas to be burned in order to compensate for the decrease in the flow rate of said waste gas being supplied to said burners; and
   iv) regulating the actual flow rate of the replacement gas supplied to said burners to about said calculated theoretical flow rate, by adjusting the degree of opening of said first flow control valve.

8. A method comprising:
   providing an installation for producing at least hydrogen, comprising:
   i) a purification unit configured to separate hydrogen from a synthesis gas and produce a waste gas;
   ii) a first line for conveying the synthesis gas to the purification unit;
   iii) a second line for conveying the waste gas from the purification unit to burners;
   iv) a buffer tank placed in said second line;

v) a third line, wherein said third line equipped with a flow control valve and connects said first line to said second line; and vi) a unit for reforming methane with steam, which is provided with said burners for its heating and which is intended for producing the hydrogen-rich synthesis gas, wherein said purification unit is located downstream of said reforming unit and intended for producing hydrogen extracted from the synthesis gas, wherein starting up the installation comprises:

i) a first step, wherein said methane reforming unit is progressively started up by supplying said burners with at least a portion of the synthesis gas produced by said reforming unit, this portion of the synthesis gas being taken by means of said third line; and ii) a second step, wherein said purification unit, which produces a waste gas, is started up, and said burners are supplied with an increasing share of waste gas progressively replacing the portion of synthesis gas supplied to the burners.

9. A method comprising:

a) reacting in a reforming unit, a gas containing methane with steam, to produce a hydrogen-rich synthesis gas;

b) extracting in a purification unit, the hydrogen present in the synthesis gas, wherein a first line conveys the synthesis gas to the purification unit;

c) recovering a waste gas from the purification unit via a second line;

d) supplying one or more burners with said waste gas via the second line; and e) heating the reforming unit by burning a supplemental auxiliary fuel, wherein, at least initially:

i) the flow rate of synthesis gas for treatment in the purification unit is reduced by removing a portion thereof by means of a third line connecting the first line and the second line;

ii) this portion is used to supply the burners; and iii) the flow rate of the supplementarily burned auxiliary fuel is simultaneously reduced.

\* \* \* \* \*

UNITED STATES PATENT AND TRADEMARK OFFICE
CERTIFICATE OF CORRECTION

PATENT NO. : 7,452,393 B2  
APPLICATION NO. : 10/496720  
DATED : November 18, 2008  
INVENTOR(S) : Yves Engler et al.

It is certified that error appears in the above-identified patent and that said Letters Patent is hereby corrected as shown below:

In Column 8, line 32, replace the words "said gas" with the words --said waste gas--.

In Column 9, line 1, replace the words "a flow" with the words --a first flow--.

Signed and Sealed this

Thirteenth Day of April, 2010

David J. Kappos  
*Director of the United States Patent and Trademark Office*